United States Patent [19]

Holcombe

[11] 4,364,159

[45] Dec. 21, 1982

[54] METHOD FOR MANUFACTURING A FORGED PISTON WITH REINFORCED RING GROOVE

[75] Inventor: W. Philip Holcombe, Chagrin Falls, Ohio

[73] Assignee: TRW Inc., Cleveland, Ohio

[21] Appl. No.: 167,850

[22] Filed: Jul. 14, 1980

[51] Int. Cl.³ .............................................. B23P 15/10
[52] U.S. Cl. ................................. 29/156.5 R; 29/447; 92/213; 92/222; 123/193 P; 277/189.5; 148/12.3; 148/12.7 A
[58] Field of Search ...................... 29/156.5 R, 156.63, 29/447; 92/213, 222, 224; 123/193 P; 277/189.5; 148/12.3, 12.7 A, 159; 72/342

[56] References Cited

U.S. PATENT DOCUMENTS

| | | | |
|---|---|---|---|
| 1,083,903 | 1/1914 | Wilm | 148/12.7 A |
| 2,124,360 | 7/1938 | Welty | 29/156.5 R |
| 2,262,074 | 11/1941 | Welty | 29/156.5 R |
| 2,396,730 | 3/1946 | Whitfield et al. | |
| 3,413,897 | 12/1968 | Atkin | 29/156.5 R |
| 3,430,969 | 3/1969 | Clary | 29/156.5 R |
| 3,515,741 | 7/1970 | Elliott | 29/156.5 R |
| 3,596,571 | 8/1971 | Hill et al. | 123/193 P |
| 3,761,252 | 9/1973 | O'Rourke et al. | 148/159 |
| 4,268,322 | 5/1981 | Willis | 148/12.7 A |

*Primary Examiner*—Daniel C. Crane
*Attorney, Agent, or Firm*—Yount & Tarolli

[57] ABSTRACT

The method effects a tight fit of a ferrous ring reinforcement at the head end of an aluminum alloy piston which tight fit remains during use of the piston. The procedural steps of the preferred method include: providing an aluminum alloy piston slug with an annular shoulder adjacent its head end; solution heat treating the aluminum alloy slug for one hour minimum at a temperature within the range of from 483° C. to 510° C. (900° F. to 950° F.); rapidly cooling the solution heat-treated aluminum alloy slug to create a super-saturated aluminum alloy solid solution; preheating the ferrous ring to approximately 538° C. (1000° F.), a temperature above the head end temperature during use of the piston, to expand the ring temporarily; preheating the aluminum alloy slug to a working temperature of approximately 204° C. (400° F.), a temperature below the head end temperature during use of the piston; telescopically assembling the preheated and temporarily expanded ring on the head end against the shoulder and forging to cause the super-saturated aluminum alloy to flow axially and transversely against the temporarily expanded ring; and age hardening the super-saturated aluminum alloy at a temperature within the range of from 210° C. to 221° C. (410° F. to 430° F.) for about nine hours to cause a constituent precipitation which, together with contraction of said ferrous ring upon cooling, effects a tight fit which remains during use of the piston.

13 Claims, 3 Drawing Figures

METHOD FOR MANUFACTURING A FORGED PISTON WITH REINFORCED RING GROOVE

BACKGROUND OF THE INVENTION

The present invention relates to a new procedure for producing an aluminum alloy piston having a ferrous ring at its head end which ferrous ring has a piston ring receiving groove therein.

Aluminum alloy pistons for use in engines are well known. In certain applications where a piston ring is mounted directly in a groove formed in an aluminum piston body, excessive wear of the piston body occurs. Such wear has known adverse effects.

The art has attempted to solve the problems created by wear between the aluminum body and the piston ring by securing a ferrous metal ring on the aluminum piston and locating the piston ring in a groove formed in the ferrous metal ring. Such structures have not been entirely satisfactory because it has been difficult to secure the ferrous metal ring on the aluminum body in an effective, reliable manner.

In previous forged aluminum alloy pistons with ferrous rings, there has been a problem of maintaining the ring securely on the head end of the piston during use. This has been particularly true where the piston has been used in an internal combustion engine and subjected to temperature extremes ranging from engine operating temperature, which is generally about 200° to 290° C. (500° to 550° F.) and ambient temperature. Examples of such pistons and methods of making same are shown in U.S. Pat. Nos. 2,124,360; 3,518,741; and 3,430,969.

U.S. Pat. No. 2,124,360 discloses a method of producing an aluminum piston with a steel, bronze or ferrous alloy reinforcing band. The procedure includes preheating the piston and ring to different temperatures depending on the shrinking tension desired in the band and the stress created in the band by the expansion of the piston body while in service. The band is shrink-fitted on a reduced diameter head end of the piston blank. The reduced diameter head end is then upset forged to create a groove for the ring adjacent the head end of the piston. Temperature cycling during use tends to permit the band to loosen.

U.S. Pat. No. 3,518,741 recognizes the problem of keeping a forged-in-place reinforcing ring in firm contact with the aluminum piston body because of stresses resulting from the difference in the thermal expansion coefficients for the ring and the piston body. It also notes that if the reinforcing ring is heated to the same forging temperature as the aluminum piston body, the subsequent upset forging operation is likely to cause ring cracking. Its suggested solution to this problem is to allow the temperatures of the ring and piston head to approach each other until there exists no more than 38° C. (100° F.) difference between them and then coining. It also refers to a bonding process of the type disclosed in U.S. Pat. No. 2,396,730, and notes that it is rather expensive and hard to control. Its review of the prior art includes mention of U.S. Pat. No. 3,430,969 and its procedure of controlling the area-to-weight ratio of the ring to reduce the problem of looseness of the reinforcing ring on a piston.

All of these prior art patents recognize the problem of obtaining a tight and reliable fit of a ferrous or other metal reinforcing ring on a piston so that the ring will remain on the piston for a substantial time during use. The instant invention solves the problem and provides an effective method for securing the ferrous ring tightly on the aluminum piston body so that it will remain on the piston for a substantial use period.

BRIEF SUMMARY OF THE INVENTION

The invention provides a method for installing on an aluminum alloy piston body a ferrous ring that provides a wear-resistant body in which to locate ring grooves for piston rings. According to the invention, a generally cylindrical aluminum alloy piston slug has formed on its outer surface an annular shoulder between the head end and skirt thereof. The aluminum alloy piston slug is solution heat treated for a period of time to effect a solid solution of the alloying constituents. Following the solution heat treating, the piston slug is rapidly cooled so that some of the alloying constituents are in a supersaturated state with respect to the solid solution. The ferrous ring is preheated to a temperature above the operating temperature of a piston head during use in an engine in order to expand the ring temporarily and provide an inner ring diameter larger than the outer diameter of the head end of the piston. The cooled, solution heat treated piston slug is preheated to a working temperature which is lower than the head end temperature of a piston during use in an engine. The preheated, temporarily expanded ferrous ring is telescopically assembled onto the head end of the preheated piston slug and seated against the shoulder. The head end of the piston slug is then forged to cause the supersaturated aluminum alloy solid solution to flow axially and transversely to the axis of the piston slug against the preheated and temporarily expanded ferrous ring.

Further in accordance with the method of the present invention, the ferrous ring-reinforced aluminum alloy piston is produced by a novel method comprising the steps of: providing an aluminum alloy piston slug with an annular shoulder on its outer surface adjacent its head end; solution heat treating the aluminum alloy slug for one hour minimum at a temperature within the range of from 483° C. to 510° C. (900° F. to 950° F.); rapidly cooling the solution heat-treated aluminum alloy slug as by a water quench to create a supersaturated aluminum alloy solid solution; preheating the ferrous ring to a temperature above the head end temperature during use of the piston, such as approximately 538° C. (1000° F.) to expand the ring temporarily; preheating the aluminum alloy slug to a working temperature of approximately 204° C. (400° F.), a temperature below the head end temperature during use of the piston; telescopically assembling the preheated and temporarily expanded ring on the head end against the shoulder and forging to cause the super-saturated aluminum alloy to flow axially and transversely against the temporarily expanded ring; and age-hardening the super-saturated aluminum alloy at a temperature within the range of from 210° C. to 221° C. (410° F. to 430° F.) for about nine hours to cause a constituent precipitation which, together with contraction of said ferrous ring upon cooling, effects a tight fit between the ferrous ring and aluminum piston body.

The novel sequence of solution heat treating the aluminum alloy slug prior to telescopically assembling and forging avoids overstressing the ring from the differential expansion of the dissimilar metals during the solution heat treating step. The subsequent age-hardening at a temperature below the piston head operating temperature does not have this adverse effect since, in accordance with the method of this invention, the ring is installed at a temperature above either of these temperatures.

The following two aspects of the process are important: (i) the solution heat-treating is done prior to the reinforcing ring being placed on the piston blank, and (ii) the blank is forged to secure the ring thereon when the blank is preferably at a temperature of about 400° F., i.e., lower than engine operating temperature, and the ring is preferably at a temperature of 1000° F., i.e., higher than the engine operating temperature.

The aluminum blank has a larger coefficient of expansion than the ferrous ring. Since solution heat treatment is performed without the ferrous ring on the aluminum blank, no stresses resulting from differential expansion are created in the ring, as in prior known processes. These prior stresses are believed to have caused a stressing of the ferrous ring to such an extent that, on cooling, the ring would not be as tight on the piston body as in the present invention. Further, since the blank is forged around the ring when the blank is at 400° F. and the ring is at 1000° F., no such stresses are applied to the ring as in the prior known process. Still further, since the blank is forged around the ring when the blank is at a temperature below engine operating temperature and the ring is above engine operating temperature, the ring will tend to tighten on the blank when the assembly is used in an engine at a temperature intermediate these preheated temperatures.

Solution heat-treating hardens the aluminum. Thus, it is difficult to forge without cracking, particularly at a temperature around 400° F. Accordingly, a dish shaped recess is preferably provided in the head end of the aluminum blank. This enables the forging of the solution heat-treated aluminum blank to be performed with a minimum chance of cracks being formed in the blank.

BRIEF DESCRIPTION OF THE DRAWINGS

Further features and advantages of the present invention will be apparent to those skilled in the art to which the present invention pertains upon a consideration of the description below made with reference to the accompanying drawings in which.

DETAILED DESCRIPTION OF THE PREFERRED EMBODIMENT

Figure 1:
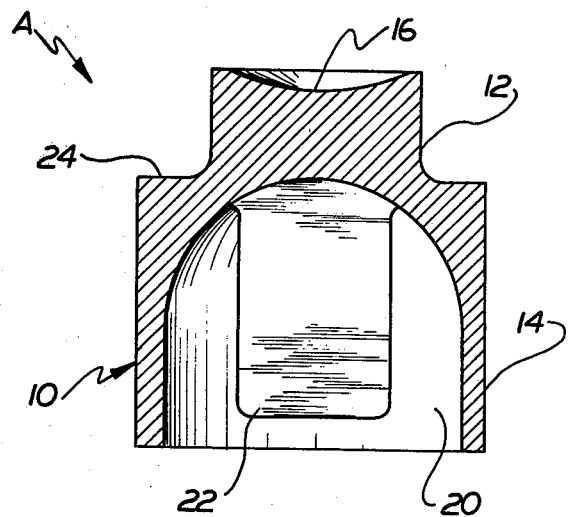
FIG. 1 is an elevational cross-sectional view through a generally cylindrical aluminum alloy piston slug having an annular shoulder between a concave head end and the skirt.

As noted hereinabove, the present invention relates to a method of making a piston having an aluminum body and a ferrous ring which is tightly secured to the aluminum body and in which at least one groove is formed for receiving a piston ring. The present method is such that the ferrous ring is tightly secured to the piston body and will remain thereon for a substantial time period during engine use. As representative of a piston manufactured by the present method, the drawings illustrate a piston A.

The piston A is manufactured from a cylindrical aluminum alloy piston slug 10 having a head end 12 and a skirt 14. The head end 12 initially has a concave depression 16. On the end opposite the head end 12 is a recess defined by an inner cylindrical skirt wall 20. A pair of reinforcing bosses 22 (only one shown) reinforce skirt 14 in the area which ultimately will be provided with piston pin receiving holes.

The aluminum alloy piston slug 10 has an annular shoulder 24 located on the outer surface of the slug between the head end 12 and the skirt 14. The small diameter of the annular shoulder 24 equals the outer diameter of the head end 12 (ignoring a fillet), the shoulder defines an annular surface transverse to the axis of the piston slug 10.

Figure 2:
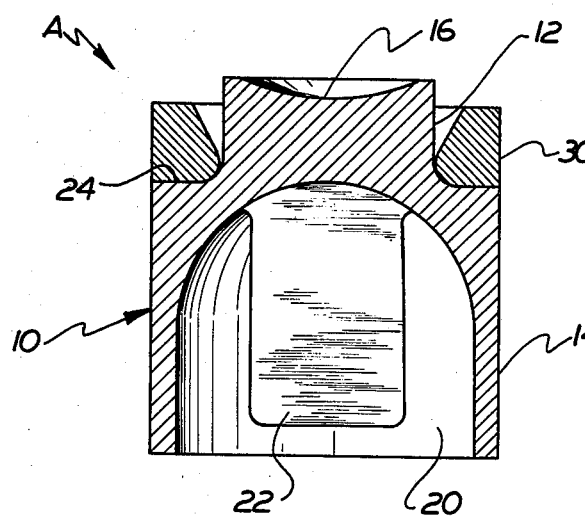
FIG. 2 is a view similar to FIG. 1 after the step of telescopically assembling the ferrous ring on the head end of the piston slug.
Figure 3:
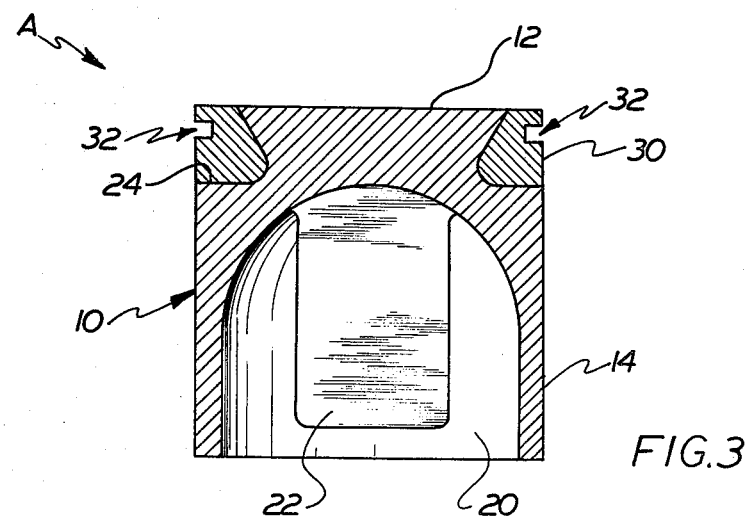
FIG. 3 is a view similar to FIGS. 1 and 2 of the completed aluminum alloy piston slug having a ferrous ring thereon.

As seen in FIG. 2, a ferrous reinforcing ring 30 is telescopically assembled on the head end 12 of the piston slug 10 against the shoulder 24. The head end 12 of the piston slug 10 is then forged thereby removing the concave depression 16 and providing an improved aluminum alloy piston having a ferrous ring reinforcement as shown in FIG. 3.

The novel method of producing the improved aluminum alloy piston of the invention includes the step of providing a generally cylindrical aluminum piston slug. Many types of aluminum alloys may be used. Of particular interest are aluminum alloys containing relatively large amounts of silicon. As is known in the art, high-silicon (8.5% to 13.0%) aluminum alloys offer the advantages of low thermal expansion and relatively high hardness which are desirable properties in the selection of a piston alloy. Although other aluminum alloys may be used, the following alloy compositions are illustrative of preferred types selected for use in the present invention:

| Element | CHEMICAL COMPOSITIONS OF SELECTED PISTON ALLOYS | | |
|---|---|---|---|
| | MS-75 | A-132 | F-132 |
| Si. | 10.5–11.5 | 11.0–13.0 | 8.5–10.5 |
| Cu. | 1.5–2.0 | .5–1.5 | 2.0–4.0 |
| Mn. | 0.4–0.9 | .35 Max. | 0.5 Max. |
| Mg. | 0.5–0.9 | 0.7–1.3 | .5–1.0 |
| Fe. | 0.7 Max. | 1.3 Max. | 1.2 Max. |
| Ni. | — | 2.0–3.0 | 0.5 Max. |
| Zn. | 0.4 Max. | .35 Max. | 1.0 Max. |
| Ti. | — | .25 Max. | 0.2 Max. |
| Aluminum and Trace Impurities | Balance | Balance | Balance |

The ferrous reinforcing ring utilized in the method may be of any of the well known high-nickel, high-chromium, iron rings. Of particular interest are the materials which are known commercially as Ni-Resist and ductile Ni-Resist compositions. These preferred materials consist essentially of: a maximum of 3.00 percent by weight carbon, 1.00 to 2.80 percent by weight silicon, 1.00 to 1.50 percent by weight manganese, 13.50 to 17.50 percent by weight nickel, 5.50 to 7.50 percent by weight copper, 1.75 to 2.50 percent by weight chromium, and the remainder being iron and trace impurities. Another preferred ferrous ring material consists essentially of: 1.80 to 2.90 percent by weight carbon, 1.75 to 3.20 percent by weight silicon, 0.80 to 1.50 percent by weight manganese, 18.00 to 22.00 percent by weight nickel, 1.75 to 2.50 percent by weight chromium, a maximum of 0.20 percent by weight phosphorous, and the remainder being iron and trace impurities.

Additional ferrous ring compositions which may be advantageously used in accordance with this invention are:

|  | 1 | 2 | 3 | 4 | 5 |
|---|---|---|---|---|---|
| Carbon | 2.90 Max. | 3.00 Max. | 3.00 Max. | 2.60 Max. | 2.60 Max. |
| Silicon | 1.75–3.2 | 1.75–3.2 | 2.0–3.0 | 1.5–2.8 | 5.0–6.0 |
| Manganese | .80–1.5 | .80–1.5 | 1.8–2.4 | .4–.8 | .4–.8 |
| Phosphorus | .2 Max. | .2 Max. | .1 Max. | .2 Max. | .2 Max. |
| Nickel | 18.0–22.0 | 18.0–22.0 | 21.0–24.0 | 28.0–32.0 | 29.0–32.0 |
| Chromium | 1.75–2.5 | 2.75–4.0 | .5 Max. | 2.5–3.5 | 4.5–5.5 |
| Iron and Trace Impurities | Balance | Balance | Balance | Balance | Balance |

It will be understood, however, that the invention is not to be limited to any specific ferrous alloy composition.

The improved method of producing an aluminum alloy piston having a ferrous ring thereon includes first the step of providing the generally cylindrical aluminum alloy piston slug 10, preferably of a shape as illustrated in FIG. 1. The piston slug 10 may be formed by any suitable procedure. For example, a blank may be cut from a cast, rolled or extruded aluminum alloy bar to the proper length to meet the desired piston weight. The blank may then be preheated to forging temperature and pre-formed so as to form a rough piston slug having a diameter close to the rough forged piston diameter. Subsequent forging may be performed to produce the piston slug 10 with the shoulder 24 and head end 12, as shown in FIG. 1. Alternatively, piston slug 10 of FIG. 1 may be provided by casting the aluminum alloy material.

The aluminum alloy piston slug 10 is then given a solution heat treatment with subsequent rapid cooling to create a super-saturated aluminum alloy solid solution. The term "solution heat treatment" is defined for purposes of the invention as:

A treatment in which an alloy is heated to a suitable temperature for a sufficient length of time to allow a desired constituent to enter into solid solution, followed by rapid cooling to hold that constituent in solution. The material is then in a super-saturated unstable state, and subsequently, may exhibit age-hardening.

This definition is from: Henderson, *Metallurgical Dictionary*, "heat treatment, solution," p. 167, Reinhold Publishing Corporation, New York, New York. The term "age-hardening" from the same source, p. 7, and for purposes of the invention is defined as:

The process of increasing the strength and hardness of a metallic material accomplished by a relatively low-temperature heat treatment that causes precipitation from solid solution of a second structural component or phase that usually is sub-microscopic.

Thus, solution heat treatment of a body of aluminum alloy material causes the components and intermetallic compounds of the selected alloy to become substantially homogeneously dispersed in solid solution within the body of the material. When the solution heat-treated body is rapidly cooled, an unstable, solid solution is achieved. The cooled body is, thus, super-saturated with respect to certain intermetallic alloying constituents which would not normally be in solid solution at low temperature. Subsequent low-temperature heat treatment or age-hardening relieves this unstable, super-saturated condition, allowing the intermetallics to precipitate as discrete crystalline components of the alloy. Precipitation also causes a slight but noticeable increase in the volume of the body, a feature which is of significant advantage in the present invention.

With respect to the preferred, high-silicon alloy compositions listed previously, the solution heat treatment of the method is performed by heating the aluminum alloy piston slug 10 to a temperature in the range of from 483° C. to 510° C. (900° F. to 950° F.) and typically at 493° C. (920° F.) for a minimum of one hour. The piston slug 10 is then rapidly cooled by a quench in water having a temperature within the range of from 71° C. to 82° C. (160° F. to 180° F.) to create a super-saturated aluminum alloy solid solution. Other alloy compositions may require a lower or higher temperature and different time periods for solution heat treatment. Those skilled in the art may readily determine these treatment parameters from available literature.

To facilitate the assembly of the ring 30 on the head end 12 against annular shoulder 24, the ferrous ring 30 is preheated to a temperature above the operating temperature of a piston in an internal combustion engine. In the preferred embodiment, the ring is preheated to approximately 538° C. (1000° F.) and the piston slug 10 to a working temperature of approximately 204° C. (400° F.). This latter temperature is lower than the temperature of head end 12 during use of the piston when installed in an operating internal combustion engine. The preheated and temporarily expanded ferrous ring 30 is telescopically assembled on the head end 12 of the piston slug 10 against shoulder 24 and the head end is forged to cause the aluminum alloy material which is in super-saturated condition due to the solution heat treating to flow axially and transversely to the axis of the piston slug 10, against the ring.

Solution heat treating hardens the aluminum. Thus, it is difficult to forge without cracking, particularly at a temperature of around 400° F. The concave depression 16 aids the forging step by providing a reduced thickness of metal and thereby facilitates metal flow outwardly over the ring 30. This results in minimizing the possibility of creating cracks.

The method includes a step of age-hardening the super-saturated aluminum alloy solid solution after the steps of telescopically assembling and forging are complete. The age-hardening is preferably performed within the temperature range of from 210° C. to 221° C. (410° F. to 430° F.) for approximately nine hours. Typically, the specific temperature used is 216° C. (420° F.).

The sequence of the procedure, and specifically the solution heat treatment of the piston slug 10 prior to assembly and forging, avoids over-stressing of the ring 30 due to the differential expansion of the ring and aluminum piston body which would otherwise occur. The subsequent age-hardening temperatures of from 210° C. to 221° C. (410° F. to 430° F.) do not have this effect because the normal piston head operating temperature in an engine is approximately 100° F. hotter than the aging temperature.

Further, since the blank is forged around the ring when the blank is at approximately 400° F. and the ring is at 1000° F., no differential expansion stresses are applied to the ring. Thus, on cooling the ring shrinks tightly around the piston body. Still further, since the blank is forged around the ring when the blank is at a temperature below engine operating temperature and the ring is above engine operating temperature, the ring will tend to tighten on the blank when the piston is used in an engine. Furthermore, as mentioned previously, precipitation of intermetallic constituents from the aluminum alloy solid solution during the age-hardening operation causes the piston body to grow. This permanent growth enhances the tight fit between the ring 30 and the head end 12.

Following installation of the reinforcing ring 30 in accordance with the above process, one or more annular piston ring grooves such as annular ring groove 32 may be cut in the outer cylindrical surface of the ferrous ring by known procedures. Although it is possible to install a ferrous ring 30 having precut ring grooves therein, the forging operation and heat treatment may cause stresses in the ferrous ring which are likely to warp or otherwise distort the ferrous ring thereby rendering any precut ring grooves useless.

What is claimed is:

1. An improved method of producing an aluminum alloy piston having a ferrous ring reinforcement comprising the procedural combination of steps of:
   providing a generally cylindrical aluminum alloy piston slug having an annular shoulder between the head end and the skirt with the smaller diameter of the annular shoulder defining the outer diameter of the head end and the shoulder defining an annular surface transverse to the axis of the piston slug,
   solution heat treating the aluminum alloy piston slug,
   rapidly cooling the solution heat-treated piston slug to create a super-saturated aluminum alloy solid solution,
   preheating a ferrous ring to a temperature which is higher than the head end temperature during use of the piston in an engine to expand the ring temporarily and to provide an inner ring diameter larger than the outer diameter of the head end,
   preheating the cooled, solution heat-treated piston slug to a working temperature which is lower than the head end temperature during use of the piston in an engine,
   telescopically assembling the preheated and temporarily expanded ferrous ring on the head end of the preheated piston slug against the shoulder and
   forging to cause the super-saturated aluminum alloy solid solution to flow axially and transversely to the axis of the piston slug against the preheated and temporarily expanded ferrous ring.

2. The method of claim 1 in which the super-saturated aluminum alloy solid solution is age-hardened after said step of forging to cause a constituent precipitation and to effect thereby a permanent expansion of the aluminum alloy which together with contraction of the ferrous ring resulting from cooling of the ring from the preheated and temporarily expanded condition for assembly effects a tight fit of the ferrous ring reinforcement at the head end of the aluminum alloy piston which tight fit remains during use of the piston.

3. The method of claim 3 in which said step of age-hardening is performed within the temperature range of from about 210° C. to about 221° C. for approximately nine hours.

4. The method of claim 1 in which said step of solution heat treating is performed at a temperature within the range of from about 483° C. to about 510° C.

5. The method of claim 4 in which said step of rapidly cooling includes quenching in water having a temperature within the range of from about 71° C. to about 82° C.

6. The method of claim 1 in which said step of preheating a ferrous ring is performed to heat the ring to approximately 538° C.

7. The method of claim 1 in which said step of providing the ferrous ring comprises the step of providing a ring of ferrous material having a composition consisting essentially of: a maximum of 3.00 percent by weight carbon, 1.00 to 2.80 percent by weight silicon, 1.00 to 1.50 percent by weight manganese, 13.50 to 17.50 percent by weight nickel, 5.50 to 7.50 percent by weight copper, 1.75 to 2.50 percent by weight chromium, and the balance being iron and trace impurities.

8. The method of claim 1 in which said step of providing the ferrous ring comprises the step of providing a ring of ferrous material having a composition consisting essentially of: 1.80 to 2.90 percent by weight carbon, 1.75 to 3.20 percent by weight silicon, 0.80 to 1.50 percent by weight manganese, 18.00 to 22.00 percent by weight nickel, 1.75 to 2.50 percent by weight chromium, a maximum of 0.2 percent by weight phosphorous, and the balance being iron and trace impurities.

9. The method of claim 1 in which said step of preheating the cooled, solution heat-treated piston slug comprises heating the piston slug to a temperature of approximately 204° C.

10. The method of claim 1 in which said step of providing the aluminum alloy piston slug comprises the step of providing a slug of aluminum alloy material having a composition consisting essentially of: 10.50 to 11.50 percent by weight silicon, 0.50 to 0.90 percent by weight magnesium, 1.50 to 2.00 percent by weight copper, 0.40 to 0.90 percent by weight manganese, a maximum of 0.70 percent by weight iron, a maximum of 0.40 percent by weight zinc, and the balance being aluminum and trace impurities.

11. The method of claim 1 in which said step of providing the aluminum alloy piston slug includes the step of providing a concave depression in its head end to facilitate flow of the super-saturated aluminum alloy axially and transversely to the axis during said forging step.

12. The method of claim 1 further including the step of cutting at least one annular piston ring groove in the cylindrical outer surface of the ferrous ring following the step of forging.

13. A method of producing an aluminum alloy piston for use in an engine and having a ferrous ring reinforcement comprising the steps of:
   providing a generally cylindrical piston slug having a head end and a skirt and formed of an aluminum alloy capable of being age hardened at a temperature less than the operating temperature of the engine to cause a constituent precipitation with a resulting expansion of the alloy, the slug having an annular shoulder between the head end and the skirt with the smaller diameter of the annular shoulder defining the outer diameter of the head end and the shoulder defining an annular surface transverse to the axis of the piston slug,
   solution heat treating the aluminum alloy piston slug,
   rapidly cooling the solution heat-treated piston slug to create a super-saturated aluminum alloy solid solution,
   preheating a ferrous ring to a temperature which is higher than the head end temperature during use of the piston in an engine to expand the ring temporarily and to provide an inner ring diameter larger than the outer diameter of the head end, preheating the cooled, solution heat-treated piston slug to a working temperature which is lower than the age hardening temperature of the alloy, telescopically assembling the preheated and temporarily expanded ferrous ring on the head end of the preheated piston slug against the shoulder, thereafter forging to cause the super-saturated aluminum alloy solid solution to flow axially and transversely to the axis of the piston slug against the preheated and temporarily expanded ferrous ring, and, after said step of forging, age hardening the super saturated aluminum alloy solid solution at said age hardening temperature to cause a constituent precipation and therefore a permanent expansion of the aluminum alloy.

* * * * *